US007916131B2

(12) United States Patent
Chiu

(10) Patent No.: US 7,916,131 B2
(45) Date of Patent: Mar. 29, 2011

(54) PROCESS FOR MONITOR TO OPERATE IN DPMS MODE

(75) Inventor: Chia-Chang Chiu, Taipei County (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 1182 days.

(21) Appl. No.: 11/591,631

(22) Filed: Nov. 2, 2006

(65) Prior Publication Data

US 2008/0106537 A1 May 8, 2008

(51) Int. Cl.
*G06F 3/038* (2006.01)
*G09G 5/00* (2006.01)

(52) U.S. Cl. ........................................ 345/211; 713/323

(58) Field of Classification Search .......... 345/211–213; 713/320, 323, 330; 725/150–153
See application file for complete search history.

(56) References Cited

U.S. PATENT DOCUMENTS

| | | | | |
|---|---|---|---|---|
| 6,763,060 | B1 * | 7/2004 | Knapp | 375/219 |
| 7,116,322 | B2 * | 10/2006 | Ko et al. | 345/211 |
| 7,188,263 | B1 * | 3/2007 | Rubinstein et al. | 713/300 |
| 7,409,567 | B2 * | 8/2008 | Hammes et al. | 713/320 |

* cited by examiner

*Primary Examiner* — Bipin Shalwala
*Assistant Examiner* — Steven E Holton
(74) *Attorney, Agent, or Firm* — Birch, Stewart, Kolasch & Birch, LLP

(57) ABSTRACT

A process for a monitor working in a DPMS mode applies when a monitor ends a working mode and enters the DPMS mode. In the DPMS mode, when the signal processor of the monitor detects there is no signal input to the connecting interface, the signal processor will be off and inform the micro-controller to open the signal detecting function to find whether there is a signal input to the connecting interface. When the micro-controller detects there is no signal input for a certain of time, the micro-controller will enter the sleep status. As a result, the purpose of saving the electricity can be achieved.

7 Claims, 3 Drawing Sheets

PROCESS FOR MONITOR TO OPERATE IN DPMS MODE

BACKGROUND OF THE INVENTION

1. Field of Invention

The invention relates to a process for reducing a monitor's power consuming, and more particularly, to a process for reducing the power consuming of a monitor which works in a DPMS mode.

2. Related Art

Presently, a monitor has to meet the requirements of Energy Star established by the U.S. Environmental Protection Agency and the Display Power Management Standard (DPMS) established by the Video Electronics Standards Association (VESA) to be qualified as an energy saving monitor. The DPMS provides a power management function for the monitor, which will process an energy saving mode when there is no signal input to the monitor so the electricity can be saved.

There are four modes in the power management for a monitor, which are normal, standby, DPMS and off. As shown in Table 1, these four modes correspond to different status of signal processor and micro-controller of the monitor and different power consuming extents respectively.

TABLE 1

| | Signal processor | Micro-controller | Power consuming |
|---|---|---|---|
| Normal | On | On | High |
| Standby | Off | Sleep | Low |
| DPMS | Sleep | On | Medium |
| Off | Off | Sleep | Low |

The normal mode is when the monitor displays. A monitor like a liquid crystal display usually has different status in its normal mode, such as a television mode and a computer mode, which have different signal sources respectively. The Off mode is when all the signal sources are closed; therefore the signal processor which is responsible for detecting the signal will also be off to save the energy. In addition, when the monitor switched from one mode to another, the monitor must switch the signal source. In this switching process, the monitor is in the DPMS mode. At this time, the monitor will try to detect the signal source. While there is no signal detected, there is no display in the monitor. But when there is a signal detected, the monitor will be in the switched mode and display.

In the prior art, the signal processor is used for detecting the signal. Therefore in the DPMS mode, the signal processor is in the sleep status. However, in order to accelerate the image output when a signal is detected, the micro-controller must be on so the monitor will certainly consume some energy. If the signal processor does not detect a signal for certain of time, the energy consuming in the DPMS mode will be tremendous. Therefore, how to reduce the energy consuming in the DPMS mode becomes a problem.

SUMMARY

According to the foregoing problems, the invention provides a process for a monitor to operate in a DPMS mode, which uses a logic gate to co-operate with the micro-controller to allow the monitor have a similar power consuming efficiency in the DPMS mode and the standby mode.

An illustrative embodiment of the process includes the following steps. In the DPMS mode, the signal processor first detects whether there is a signal input to the connecting interface. When there is no signal input, the signal processor informs the micro-controller to start the signal detecting function to detect the signal input of the connecting interface, processes the shut down procedure to be off and informs the micro-processor its status. The micro-controller opens the signal detecting function to detect whether there is a signal input to the connecting interface. The micro-controller checks whether the pin which connects the logic gate to the micro-controller has a potential change to determine whether there is a signal input to the connecting interface. If there is no potential change, the micro-controller will check whether the potential of the pin doesn't change for a certain time. If the pin doesn't have the potential change for a certain time, the micro-controller will be in the sleep mode and wait for the potential change of the pin.

According to the description above, the technique of the invention is when the monitor is in the DPMS mode and there is no signal input, the signal processor will be off and the micro-controller will be used instead to detect whether there is a signal input to the connecting interface. After certain of time while no signal input is detected, the micro-controller will be in the sleep mode so the purpose of saving the electricity can be achieved.

BRIEF DESCRIPTION OF THE DRAWINGS

The present invention will become more fully understood from the detailed description given below, which is for illustration only and thus is not limitative of the present invention, wherein.

DETAILED DESCRIPTION

The invention supports four types of energy management modes for a monitor, such as normal, standby, DPMS and off. The technique of the invention is to change the action of the monitor in the DPMS mode to reduce the energy consuming.

Figure 1:
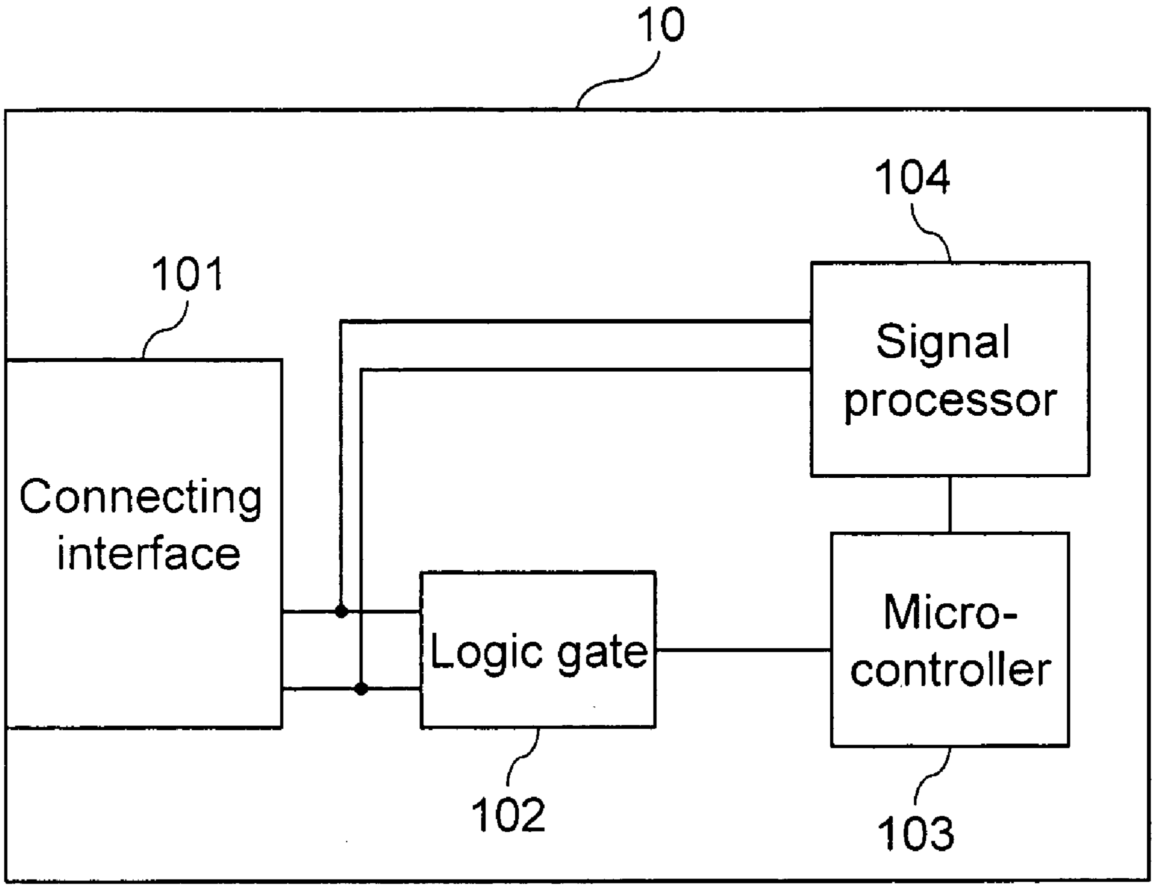
FIG. 1 is a block diagram of a monitor according to the invention.

Please refer to FIG. 1 of a block diagram of a monitor 10 according to the invention. As shown in FIG. 1, the monitor 10 includes a connecting interface 101, a logic gate 102, a micro-controller 103, and a signal processor 104. The connecting interface 101 couples to the logic gate 102 and the signal processor 104, the micro-controller 103 couples to the logic gate 102 and the signal processor 104 and at least one electric signal will transmit between the coupled devices.

Figure 2A:
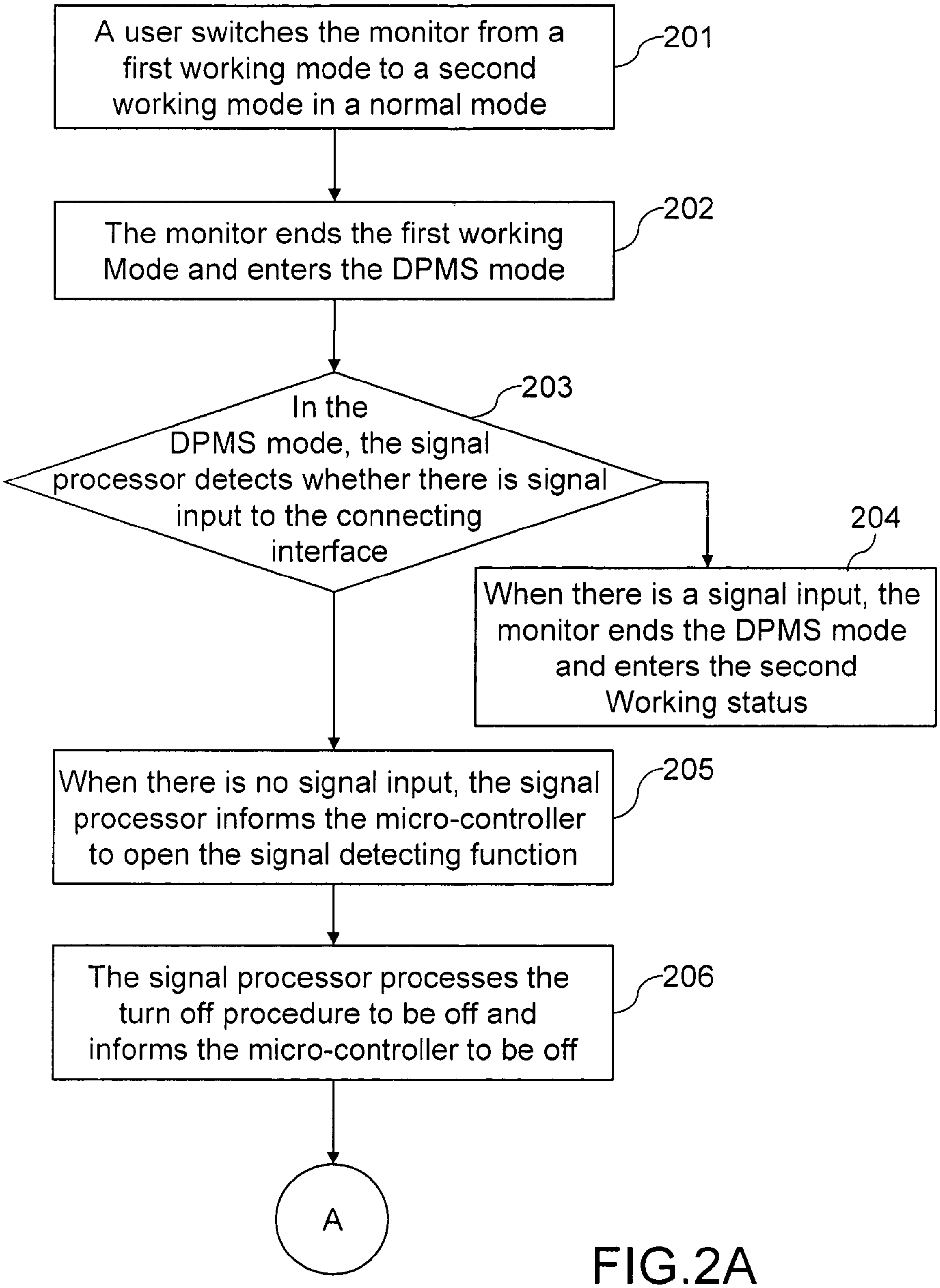
FIG. 2A shows a part of process of a monitor working in a DPMS mode of the invention.
Figure 2B:
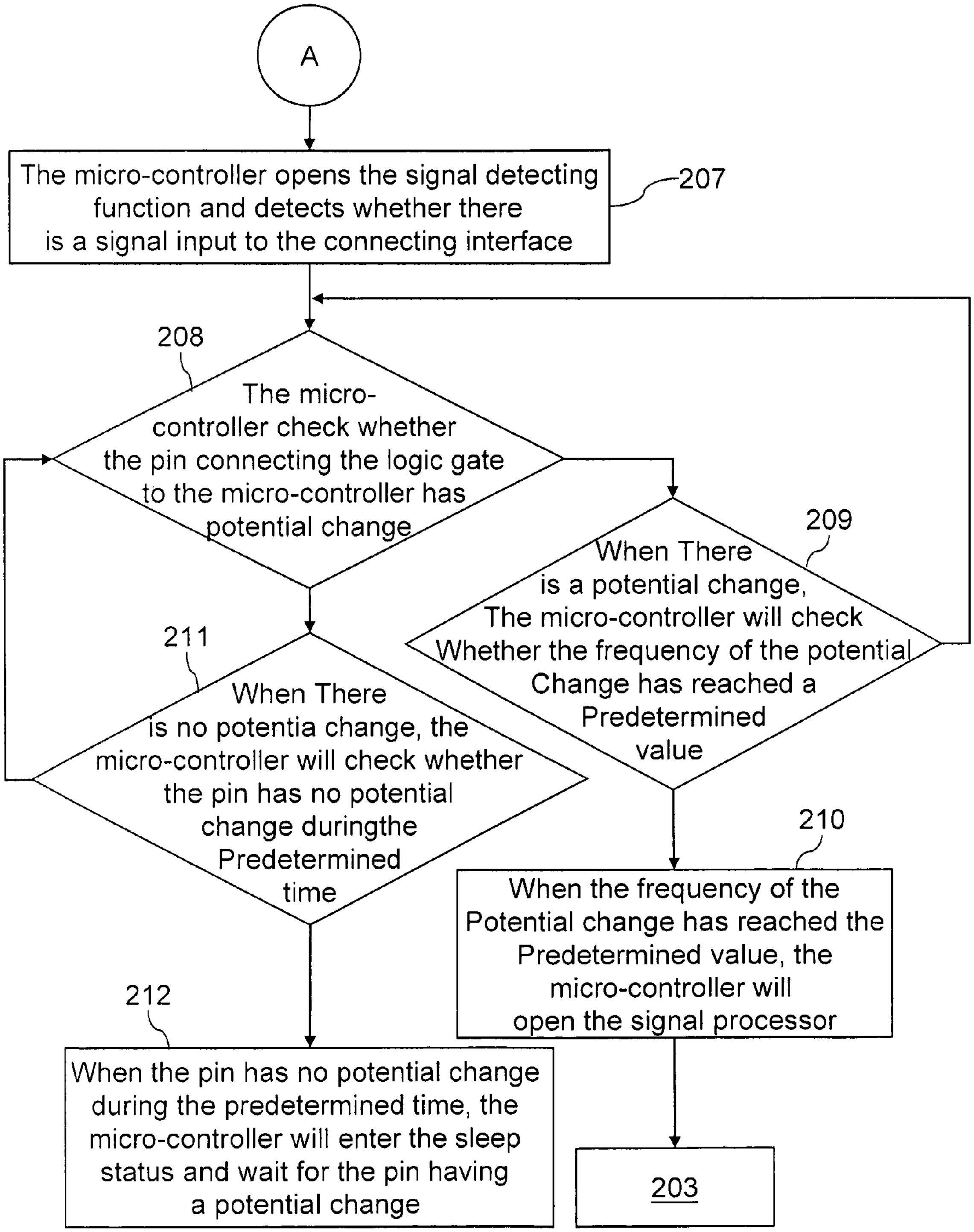
FIG. 2B shows a part of process of a monitor working in a DPMS mode of the invention.

In the invention, the micro-controller 103 is used in the DPMS mode to replace the signal processor 104 to detect whether there is a signal input to the connecting interface 101 in order to save the energy. FIGS. 2A and 2B show the processes of the monitor 10 in the DPMS mode. When a user switches the monitor 10 from a first working mode to a second working mode in the normal mode at the beginning (step 201), the monitor 10 will end the first working mode and then enter the DPMS mode (step 202). In the DPMS mode, the signal processor 104 will detect the signal source of the second working mode first, where it will detect whether there is a signal input to the connecting interface 101 (step 203). If there is a signal input, the monitor 10 will end the DPMS mode and enter the second working mode, and the signal processor 104 will process the image display in the second working mode (step 204). Following the step 203, if there is no signal input, the signal processor 104 will inform the micro-controller 103 to open the signal detecting function to detect the signal input of the connecting interface 101 (step 205), and the signal processor 104 will carry on the turn off procedure to be off and inform the micro-controller 103 to be off too (step 206). Following the step 206, the micro-controller 103 opens the signal detecting function to detect whether the signal source of the second working mode, which is also the connecting interface has a signal input (step 207). The invention uses the logic gate 102 to connect the micro-controller 103 and the connecting interface 101. The micro-controller 103 will check whether the pin which connects the logic gate 102 to the micro-controller 103 has a potential change to determine whether there is a signal input to the connecting interface 101 (step 208). If there is a potential change, the micro-controller 103 will check whether the frequency of the potential change has reached a predetermined value (step 209). If the frequency of the potential change has reached the predetermined value, the micro-controller 103 will open the signal processor 104 to process the step 203 (step 210). Following the step 209, if the frequency of the potential change does not reach the predetermined value, the step 208 will then proceed. Following the step 208, if there is no potential change, the micro-controller 103 will check Whether the pin has no potential change for a predetermined time (step 211). If the pin has no potential change during the predetermined time, the micro-controller 103 will then be in the sleep status and wait the pin has a potential change (step 212). Following the step 211, if the pin has a potential change during the predetermined time, then the step 208 will proceed.

According to one preferred embodiment of the invention, the monitor 10 can be a display, such as a liquid crystal television, where its first working mode can be a television mode and its second working mode can be a computer mode. The signal source of the second working mode is the connecting interface 101, which can be a D-sub port, a digital visual interface (DVI), a high-definition multimedia interface (HDMI) or a unified display interface (UDI).

Using the D-sub port as an example in this embodiment, the signal lines are connected from the tenth, eleventh, thirteenth and fourteenth pins of the D-sub port to the pins of the logic gate 102 and the signal processor 104, where the tenth and eleventh pins are used for ground connection of the H-sync signal and the V-sync signal respectively, and the thirteenth and fourteenth pins are used for transmitting the H-sync signal and the V-sync signal respectively. In this embodiment, the logic gate 102 connects to the general purpose input/output pin of the micro-controller 103 and outputs the signal to it. If the general purpose input/output pin is low potential enabled, the logic gate 102 can be a NOR type logic gate. That is, when there is no signal input to the D-sub port and the thirteenth and fourteenth pin are low potential, the general purpose input/output pin of the micro-controller 103 which connects to the NOR type logic gate 102 will be high potential. On the other hand, when there is a signal input to the D-sub port, the thirteenth and fourteenth pins will be high potential and the NOR type logic gate will be low potential so the micro-controller 103 will be enabled.

When a user switches the monitor 10 from the television mode to the computer mode (similar to step 201) at the beginning, the monitor 10 will end the television mode and then enter the DPMS mode (similar to step 202). In the DPMS mode, the signal processor 104 will detect whether the D-sub port has an H-sync and a V-sync signal input, that is, whether there is a potential change to the pin which connects the D-sub port to the signal processor 104 (similar to step 203). If the signal processor detects there is an H-sync and a V-sync signal input, the monitor 10 will end the DPMS mode and enter the second working mode, and the signal processor 104 will process the image display of the computer mode (similar to step 204). If the signal processor detects there is no signal input, the signal processor 104 will inform the micro-controller 103 to open the signal detecting function to detect the signal input of the D-sub port (similar to step 205).

The signal processor 104 will then carry on the turn off procedure to be off and inform the micro-controller 103 to be off too (similar to step 206). The micro-controller 103 will open the signal detecting functions to detect whether the D-sub port has a signal input through the output of the NOR type logic gate (similar to step 207). The micro-controller 103 will check whether the pin which connects the NOR type logic gate to the micro-controller 103 has a potential change (similar to step 208). If the NOR type logic gate outputs a low potential, which means the D-sub port has an H-sync signal and a V-sync signal input, then the micro-controller 103 will check whether the frequency of the potential change has reached a predetermined value (similar to step 209). If the frequency of the potential change has reached the predetermined value, the micro-controller 103 will open the signal processor 104 to process the step 203 (similar to step 210). Following the step 209, if the frequency of the potential change does not reach the predetermined value, the step 208 will then proceed. Following the step 208, if there is no potential change, the micro-controller 103 will check whether the pin has no potential change for a predetermined time (similar to step 211). If the pin has no potential change during the predetermined time, the micro-controller 103 will then switch from the working status to the sleep status and wait for the pin having a potential change (similar to step 212). Following the step 211, if the pin has a potential change during the predetermined time, then the step 208 will proceed.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A process for a monitor to operate in a DPMS mode, which applies when a user switches the monitor from a first working mode to a second working mode and the monitor ends the first working mode and enters the DPMS mode, the process comprising the following steps:

detecting whether there is a signal input to a connecting interface for the second working mode by a signal processor;

when there is no signal input to the connecting interface, the signal processor informing a micro-controller to open a signal detecting function so that the micro-controller detects the signal input of the connecting interface;

turning off the signal processor;

detecting whether there is a potential change to a pin of the micro-controller;

when the pin has no potential change during a predetermined time interval, the micro-controller entering a sleep mode and waiting for the pin having a potential change.

2. The process of claim 1, wherein a logic gate is used to connect the connecting interface to the pin of the micro-controller and is used to respond to the signal input of the connecting interface to produce a potential change of the pin.

3. The process of claim 1, wherein in the step of detecting whether there is a signal input to the connecting interface for the second working mode by the signal processor, when there is a signal input to the connecting interface, the monitor will end the DPMS mode and enter the second working mode and the signal processor will process the image display in the second working mode.

4. The process of claim 1, said step of detecting whether there is a potential change to a pin of the micro-controller, further comprising:

the micro-controller checking whether a frequency of the potential change has reached a predetermined value when the pin has a potential change; and the micro-controller opening the signal processor and the signal processor starting to detect whether there is a signal input to the connecting interface when the frequency of the potential change has reached the predetermined value.

5. The process of claim 4, wherein when the frequency of the potential change has not reached the predetermined value, the micro-controller starts to check whether the pin has a potential change.

6. The process of claim 1, wherein in the step of the micro-controller checking whether the pin has no potential change during the predetermined time when the pin has no potential change, when the pin has a potential change during the predetermined time, the micro-controller will check whether the pin has a potential change.

7. The process of claim 2, wherein the logic gate is a NOR type logic gate.

* * * * *